United States Patent [19]

Goltsov et al.

[11] 3,881,891

[45] May 6, 1975

[54] METHOD FOR PREPARATION OF SUPER-HIGH PURITY HYDROGEN

[76] Inventors: Viktor Alexeevich Goltsov, ulitsa Belinskogo, 8/10, kv. 7; Pavel Vladimirovich Geld, ulitsa Mira, 36, kv. 78; Genrikh Efimovich Kagan, ulitsa Komsomolskaya, 50, kv. 77; Nikolai Ivanovich Timofeev, prospekt Lenina, 62, korpus 5, kv. 17, all of Sverdlovsk, U.S.S.R.

[22] Filed: Feb. 12, 1973

[21] Appl. No.: 331,705

[52] U.S. Cl. .................................................. 55/16
[51] Int. Cl. ............................................ B01d 53/22
[58] Field of Search ............................... 55/16, 158

[56] References Cited
UNITED STATES PATENTS

| | | | |
|---|---|---|---|
| 3,155,467 | 11/1964 | Yamamoto et al. | 55/16 |
| 3,214,245 | 10/1965 | Peters | 55/158 |
| 3,350,845 | 11/1967 | McKinley | 55/16 |

Primary Examiner—Charles N. Hart

[57] ABSTRACT

A method for preparation of super-high purity hydrogen consisting in that technical hydrogen is purified or isolated from a hydrogen-containing gaseous mixture by the diffusion method. In the method according to the invention, water vapour is preliminarily added into the original gaseous mixture in amount to raise the partial pressure of the water vapour in the obtained mixture to not less than 5 mm Hg.

The above mentioned mixture at a pressure not less than 1 atm is supplied to a diaphragm made of palladium or its alloys and heated to a temperature 200 –900 C, the pressure of the diffused pure hydrogen is maintained less than its partial pressure in the original mixture Hg.

The proposed method rules out poisoning of surface of the diaphragm made of palladium or its alloys and hence maintains the initial high hydrogen permeability of the filtering element.

3 Claims, No Drawings

METHOD FOR PREPARATION OF SUPER-HIGH PURITY HYDROGEN

The invention relates to methods for preparation (production) of super-high purity hydrogen by purification of technical hydrogen by the diffusion method or isolation of hydrogen from hydrogen-containing gaseous mixtures.

Methods are known in the prior art for the production of super-high purity hydrogen by the diffusion purification of technical hydrogen or isolation of hydrogen from hydrogen-containing mixtures wherein the original gas flow is supplied to the diaphragm made of palladium or its alloys at a pressure not less than 1 atm, at a temperature of the diaphragm 200°–900°C the pressure of the diffused hydrogen is maintained less than its partial pressure in the original mixture (See patent of U.S. Pat. Nos. 2,773,561, cl. 183–115; 2,962,133, cl. 183–115; patent of Japan Pat. No. 408573; cl. 10K4, series 2, col. 984, 1963; Inventor's Certificate of USSR Pat. No. 182698, cl.12i, 1/32).

The disadvantage inherent in the known methods for the preparation of super-high purity hydrogen is that in the course of operation of hydrogen purifying units the hydrogen-permeability of the diaphragm made of palladium or its alloys is reduced considerably as a result of poisoning of the metal surface with admixtures contained in the gaseous phase.

One of the components present in the gaseous phase and strongly poisoning the metal surface is hydrogen sulphide. In order to avert the noxious effect of hydrogen sulphide on the diaphragm, palladium is alloyed with gold, the noble metal content of the alloy being as high as 55 percent by weight (See U.S. Pat. No. 3,350,845, cl.55-16).

The disadvantage of this method is that the high gold content of the alloys on the basis of palladium reduces considerably the hydrogen-permeability of the alloys and increases their cost.

The object of this invention is to work out a method for preparation of super-high purity hydrogen which would rule out poisoning of the surface of the diaphragm made of palladium or its alloys and hence would maintain the initial high hydrogen-permeability of the filtering element.

In accordance with this and other objects, the invention consists in that super-high purity hydrogen is prepared by diffusion purification of technical hydrogen or isolation of hydrogen from a hydrogen-containing gaseous mixture, wherein the original gas flow is supplied to the diaphragm made of palladium or its alloys at a pressure not less than 1 atm, at a temperature of the diaphragm from 200° to 900°C, the pressure of the diffused hydrogen is maintained less than its partial pressure in the original mixture. According to the invention, water vapour is added to into the original gas flow prior to its diffusion purification or isolation of hydrogen to raise the partial pressure of the water vapour in the obtained mixture to not less than 5 mm Hg.

It is recommended that prior to the diffusion purification or isolation of hydrogen, water vapour should be injected into the original gas flow so that the partial pressure of the water vapour in the obtained mixture should be from 80 to 760 mm Hg.

The proposed method for preparation of super-high purity hydrogen completely rules out contamination of the surface of palladium or its alloys. As a result, the initial high hydrogen-permeability of the diaphragm made of the above mentioned materials remains stable throughout the entire period of its operation, which in turn increases markedly the productivity of the hydrogen purifying unit.

The greatest effect in utilization of the proposed method will be attained if the original hydrogen-containing gaseous mixture contains for example strongly contaminating the metal surface hydrogen sulphide. The proposed method obviates the use of alloys containing high percentage of gold as in the case of the known methods.

Injection of water vapour into the original gas flow recovers also the initial high hydrogen-permeability of the diaphragm made of palladium or its alloys, rules out the superficial poisoning of the metal, and hence ensures high and stable hydrogen-permeability of the diaphragm.

The proposed method of preparing super-high purity hydrogen is realized as follows.

Technical hydrogen, for example, electrolytic hydrogen, or any gaseous mixture containing hydrogen (a mixture containing hydrogen, carbon dioxyde and hydrogen sulphide, nitrogen-hydrogen mixture, etc) is supplied to a diaphragm (diaphragm made of palladium or its alloys can have any suitable shape) at a pressure not less than 1 atm the temperature of the diaphragm being from 200° to 900°C. Water vapour is preliminarily injected into the gas flow. The pressure of pure hydrogen on the other side of the diaphragm is maintained less than the partial hydrogen pressure in the original mixture. Under these conditions the hydrogen diffused through the heated diaphragm is purified.

According to the proposed method water vapour may be added to an original gaseous mixture or to the technical hydrogen by any of known methods: original gaseous mixture may be saturated with water vapours by known ways, or saturated gaseous mixtures may be supplied into the original gaseous mixture, or some water may be injected may be added to an original gaseous mixture untill or in the course of operation of hydrogen purifying units; water vapour may be added from time to time or continuously.

To provide optimum conditions for operation of the purifying units it is recommended to maintain the partial pressure of water vapour in original gaseous mixtures within 80–760 mm Hg.

As a result of realization of the proposed method, the productivity and the service life of the diffusion purifying units can be increased significantly on account of maintaining the initial high hydrogen-permeability of the diaphragm.

For a better understanding of the invention, the following examples illustrating the method for preparation super-high purity of hydrogen by the diffusion purification of technical hydrogen or isolation of hydrogen from a hydrogen-containing gaseous mixture are given hereinafter.

EXAMPLE 1

Technical hydrogen, for example electrolytic hydrogen was purified by diffusion. The original gaseous mixture at a pressure of 760 mm Hg in which the partial pressure of water vapour was 5 mm Hg, was supplied to the palladium diaphragm, made in the form of the membrane 0.1 mm thick. The pressure of pure hydrogen on the other side of the diaphragm was maintained at $10^{-3}$ mm Hg.

The hydrogen-permeability of the diaphragm at the working temperature of 500°C was $14.3 \times 10^{-2}$ cu.cm/sq.cm × sec.

When technical hydrogen was purified under similar conditions, except water vapour injection into the original gas flow, the hydrogen-permeability of the palladium diaphragm was $9.5 \times 10^{-2}$ cu.cm/sq.cm × sec.

So the productivity of the diffusion purifying units during the purification of technical hydrogen according to the proposed method may be increased 1.5 fold due to the maintaining of the initial high hydrogen-permeability of the diaphragm.

EXAMPLE 2

Technical hydrogen, for example, electrolytic hydrogen was purified by diffusion. The original gaseous mixture at a pressure of 5 atm, in which the partial pressure of water vapour was 200 mm Hg, was supplied to the diaphragm of the alloy of 80 percent palladium, 15 percent silver and 5 percent cobalt (by weight) made in the form of the membrane 0.1 mm thick. The pressure of pure hydrogen on the other side of the diaphragm was maintained at 760 mm Hg.

The hydrogen-permeability of the diaphragm at a working temperature of 350°C was $4.14 \times 10^{-2}$ cu.cm/sq.cm × sec.

Hydrogen-permeability of the diaphragm during purification of technical hydrogen under similar conditions except water vapour injection into the original gas flow, was $2.95 \times 10^{-2}$ cu.cm/sq.cm × sec.

So the productivity of the diffusion purifying units during the purification of technical hydrogen according to the proposed method may be increased 1.4 fold due to maintaining the initial high hydrogen permeability of the diaphragm.

EXAMPLE 3

Technical hydrogen, for example, electrolytic hydrogen, was purified by diffusion. The original gaseous mixture at a pressure of 10 atm, in which the partial pressure of water vapour was 360 mm Hg was supplied to the diaphragm of the alloy of 95 percent palladium, and 5 percent nickel (by weight) made in the form of tubes with walls 0.1 mm thick. The pressure of pure hydrogen on the other side of the diaphragm was maintained at 760 mm Hg.

The hydrogen permeability of the diaphragm at the working temperature of 400°C was $9.5 \times 10^{-2}$ cu.cm/sq.cm × sec.

Hydrogen permeability during purification of technical hydrogen under similar conditions, except water-vapour injection into the original gas flow, was $5.9 \times 10^{-2}$ cu.cm/sq.cm × sec.

So the productivity of the diffusion purifying units during the purification of technical hydrogen according to the proposed method may be increased 1.6 fold due to the maintaining of the initial high hydrogen permeability of the diaphragm.

EXAMPLE 4

The original gaseous mixture consisted of hydrogen, carbon dioxyde, hydrogen sulphide and water vapour. The partial pressures of the constituents were as follows: hydrogen, 380 mg Hg; carbon dioxyde, 150 mm Hg; hydrogen sulphide, 20 mm Hg and water vapour, 210 mm Hg. The obtained mixture was at a pressure of 760 mm Hg supplied to the diaphragm of the alloy consisting of 80 percent palladium, 15 percent silver and 5 percent platinum by weight. The temperature of the diaphragm was 450°C. The pressure of pure hydrogen on the other side of the diaphragm was maintained at $10^{-3}$ mm Hg.

The hydrogen permeability of the diaphragm under these conditions was $1.23 \times 10^{-1}$ cu.cm/sq.cm × sec.

During isolation of hydrogen under similar conditions, except water vapour injection into the original gaseous mixture, the hydrogen permeability of the diaphragm was $0.77 \times 10^{-2}$ cu.cm/sq.cm × sec.

So the proposed method is especially effective in the case of the isolation of super-high purity hydrogen out of the mixture containing hydrogen sulphide. The productivity of the purifying units may be increased 16 fold on account of the maintaining of the initial high hydrogen permeability of the diaphragm.

EXAMPLE 5

Water vapour was added to the original gaseous mixture which contained 75 percent by volume hydrogen and 25 percent by volume nitrogen. The partial pressure of the water vapour in the mixture was 600 mm Hg. The prepared mixture at a pressure of 300 atm was supplied to the diaphragm of the alloy consisting of 85 percent palladium, 10 percent silver and 5 percent nickel by weight. The temperature of the diaphragm was 500°C. The pressure of pure hydrogen on the other side of the diaphragm was maintained 1 atm.

Under these conditions, the hydrogen permeability of the diaphragm was 1.44 cu. cm/sq. cm × sec.

During isolation of hydrogen under similar conditions except water-vapour injection into the original mixture, the hydrogen permeability of the diaphragm was only 0.85 cu.cm/sq.cm × sec.

So the productivity of the diffusion purifying units during the isolation of super-high purity hydrogen out of gaseous mixture according to the proposed method may be increased 1.7 fold due to the maintaining of the initial high hydrogen permeability of the diaphragm.

EXAMPLE 6

Water vapour was added to a original gaseous mixture consisted of 85 percent by volume hydrogen and 15 percent by volume nitrogen. The partial pressure of the water vapour in the mixture was 80 mm Hg. The obtained mixture at a pressure of 20 atm was supplied to the diaphragm of the alloy of 65.1 percent palladium, 20 percent silver, 10 percent gold, 0.9 percent ruthenium, 2 percent platinum and 2 percent aluminum by weight. The temperature of the diaphragm was 300°C. The pressure of pure hydrogen on the other side of the diaphragm was maintained at 1 atm level.

Under these conditions the hydrogen permeability of the diaphragm was $2.2 \times 10^{-1}$ cu.cm/sq.cm × sec.

During isolation of super-high purity hydrogen under similar conditions, but with no water vapour injection to the original gaseous mixture, the hydrogen permeability of the diaphragm was only $1.4 \times 10^{-1}$ cu.cm/sq.cm × sec.

So the productivity of the diffusion purifying units during the isolation of super-high purity hydrogen out of gaseous mixture according to the proposed method may be increased 1.6 fold due to the maintaining of the initial high hydrogen permeability of the diaphragm.

EXAMPLE 7

Technical hydrogen was purified by diffusion. The original gaseous mixture having the partial pressure of water vapour 10 mm Hg, was supplied at a pressure of 1 atm to the diaphragm of the alloy consisting of 85 percent palladium and 15 percent ferrum by weight made in the form of a 0.1 mm thick membrane.

The pressure of pure hydrogen on the other side of the diaphragm was maintained at 1 mm Hg.

The hydrogen permeability of the diaphragm at a working temperature of 900°C was $3.4 \times 10^{-2}$ cu.cm/sq.cm × sec.

Hydrogen-permeability of the diaphragm during purification of technical hydrogen under similar conditions except water vapour injection into the original gas flow, was $1.9 \times 10^{-2}$ cu.cm/sq.cm × sec.

So the productivity of the diffusion purifying units during the purification of technical hydrogen according to the proposed method may be increased 1.8 fold due to the maintaining of the initial high hydrogen-permeability of the diaphragm.

EXAMPLE 8

Technical hydrogen was purified by diffusion. The original gaseous mixture having the partial pressure of water vapour 5 atm, was supplied at a pressure of 500 atm to the diaphragm of the alloy consisting of 76 percent palladium, 20 percent silver, 2.5 percent gold 0.5 percent ruthenium, 0.5 percent aluminum and 0.5 percent platinum by weight made in the form of a 0.2 mm thick membrane. The pressure of pure hydrogen on the other side of the diaphragm was maintained 30 atm.

The hydrogen permeability of the diaphragm at a working temperature of 400°C was 0.8 cu.cm/sq.cm × sec.

Hydrogen-permeability of the diaphragm during purification of technical hydrogen under similar conditions except water vapour injection into the original gas flow was 0.35 cu.cm/sq.cm × sec.

So the productivity of the diffusion purifying units during the purification of technical hydrogen according to the proposed method may be increased 2.4 fold due to the maintaining of the initial high hydrogen permeability of the diaphragm.

EXAMPLE 9

The original gaseous mixture consisted of 60 vol. percent hydrogen, 30 vol. percent carbon dioxyde, 6 vol. percent carbon oxide, 3 vol. percent methan and 1 vol. percent hydrogen sulphide. The obtained mixture was supplied at a pressure of 15 atm to a 70 percent palladium and 30 percent silver by weight alloy diaphragm made in the form of a 0.1 mm thick diaphragm.

The temperature of the diaphragm was 500°C.

The pressure of pure hydrogen on the other side of the diaphragm was maintained at 1 atm.

Under these conditions in operation the surface of the diaphragm strongly poisoning with hydrogen sulphide and the other mixtures and so hydrogen permeability was $3.1 \times 10^{-2}$ cu.cm/sq.cm × sec.

Water vapour was added to the above mentioned gaseous mixture. The partial pressure of the water vapour in this mixture was 450 mm Hg.

As a result of water vapour injection into the original gaseous mixture the initial high hydrogen permeability of the diaphragm was recovered under these conditions.

High and stable hydrogen permeability was $3.7 \times 10^{-1}$ cu.cm/sq.cm × sec.

So the productivity of diaphragm during the isolation of super-high purity hydrogen out of the gaseous mixture according to the proposed method may be increased 12 fold.

EXAMPLE 10

The original gaseous mixture consisted of 70 vol. percent hydrogen, 25 vol. percent carbon dioxide, 5 vol. percent hydrogen sulphide. The obtained mixture was supplied at a pressure of 30 atm to a 85 percent palladium and 15 percent silver by weight alloy diaphragm, made in the form of the 0.08 mm thick membrane. The temperature of the diaphragm was 450°C. The pressure of pure hydrogen on the other side of the diaphragm was 1.5 atm.

In operation the diaphragm surface was hardly poisoned with hydrogen sulphide and hydrogen-permeability after 10 hours operation reduced to $1.97 \times 10^{-2}$ cu.cm/sq.cm × sec.

Water vapour was added to the above mentioned original gaseous mixture. The partial pressure of the water vapour in the mixture was 760 mm Hg. As a result of water vapour injection into the original gaseous mixture the initial high hydrogen permeability of the diaphragm was recovered completely. Under these conditions high and stable hydrogen permeability was $6.1 \times 10^{-1}$ cu.cm/sq.cm × sec.

So according to the proposed method the productivity of the diffusion purifying units during the isolation of super-high purity hydrogen out of the mixture containing a great deal of hydrogen sulphide may be increased 30 fold on account of the recovery of the initial high hydrogen permeability of the diaphragm.

EXAMPLE 11

Dry technical hydrogen was purified by diffusion. The hydrogen at a pressure of 1 atm was supplied to the palladium diaphragm made in the form of a 0.1 mm thick foil. The pressure of pure hydrogen on the other side of the diaphragm was maintained at 20 mm Hg.

The hydrogen-permeability of the diaphragm at the working temperature of 550°C was $3.1 \times 10^{-2}$ cu.cm/sq.cm × sec.

From time to time the mixture of technical hydrogen and water vapour was supplied to the original gaseous flow of the dry technical hydrogen.

The partial pressure of water vapour in the obtained mixture was 20 mm Hg.

Under this conditions the hydrogen permeability of the diaphragm was stable. It was $1.5 \times 10^{-1}$ cu.cm/sq.cm × sec.

So the productivity of the diffusion purifying units during the purification of technical hydrogen according to the proposed method may be increased 5 fold due to the recovery of the initial high hydrogen permeability of the diaphragm.

EXAMPLE 12

The original gaseous mixture consisted of 80 vol. percent hydrogen and 20 vol. percent nitrogen. This mixture at a pressure of 1 atm was supplied to the diaphragm of the alloy of 93 percent palladium and 7 percent silver by weight made in the form of 0.05 mm thick foil.

The pressure on the side of pure hydrogen was maintained at 10 mm Hg. The hydrogen permeability of the diaphragm at the working temperature 200°C was 5.9 × $10^{-2}$ cu.cm/sq.cm × sec.

From time to time some water injected into the original gaseous mixture. Being evaporated it provide the partial pressure of the water vapour from 5 to 10 mm Hg.

Under these conditions the hydrogen permeability of the diaphragm was 9.4 × $10^{-2}$ cu.cm/sq.cm × sec.

So the productivity of the diffusion purifying units during the isolation of super-high purity hydrogen out of the gaseous mixture according to the proposed method may be increased 1.7 fold due to the recovery of the initial high hydrogen permeability of the diaphragm.

We claim:

1. A process for the preparation of super-high purity hydrogen comprising adding water vapor to a gaseous mixture containing hydrogen to produce a partial pressure of water vapor between 5 and 760 mm of mercury in said gaseous mixture, and diffusing said gaseous mixture containing water vapor at a total pressure from 1 atmosphere to 300 atmospheres through a diaphragm made of palladium or its alloys heated to a temperature of 200°–900°C, wherein the pressure of the diffused pure hydrogen is maintained less than its partial pressure in the original mixture.

2. A process according to claim 1, wherein water vapor is added to the gaseous mixture containing hydrogen to produce a partial pressure of water vapor in said mixture between 80 and 760 mm of mercury.

3. A process according to claim 1 wherein said original gaseous mixture also contains hydrogen sulfide.

* * * * *